United States Patent

Wycoff

[11] Patent Number: 5,044,168
[45] Date of Patent: Sep. 3, 1991

[54] APPARATUS AND METHOD FOR LOW REFRIGERANT DETECTION

[76] Inventor: Lyman W. Wycoff, 827 Haymount Dr., Indianapolis, Ind. 46241

[21] Appl. No.: 567,314

[22] Filed: Aug. 14, 1990

[51] Int. Cl.$^5$ .................... F25B 49/00; F24F 11/02
[52] U.S. Cl. .......................... 62/126; 62/129
[58] Field of Search ............... 62/126, 125, 127, 129, 62/208, 209, 203

[56] References Cited

U.S. PATENT DOCUMENTS

| | | | |
|---|---|---|---|
| 4,220,010 | 9/1980 | Mueller et al. | 62/126 |
| 4,265,091 | 5/1981 | Kobayashi | 62/129 X |
| 4,653,280 | 3/1987 | Hansen et al. | 62/127 |
| 4,848,096 | 7/1989 | Funahashi et al. | 62/129 X |

FOREIGN PATENT DOCUMENTS 0148611 11/1980 Japan .................... 62/129

Primary Examiner—Harry B. Tanner

[57] ABSTRACT

The invention provides an apparatus and a method for detecting low refrigerant condition in a closed loop refrigeration system. Separate pressure transducers are installed to measure the suction and discharge pressures of the refrigeration system. When the compressor is shut off, usually to remove the frost from the evaporator coils, the pressure difference between the discharge and suction pressures is measured by a microprocess-based control circuit. A low refrigerant alarm or indicator is activated if the pressure difference is below a predetermined value programmed in the control circuit.

8 Claims, 1 Drawing Sheet

APPARATUS AND METHOD FOR LOW REFRIGERANT DETECTION

BACKGROUND OF THE INVENTION

1. Technical Field

This invention relates to a refrigeration system and more particularly to an apparatus and method for detecting a low refrigerant condition in a closed loop refrigeration system.

2. Description of Prior Art

Commonly used refrigeration systems use freon as a refrigerant, which usually leaks from the refrigeration system several times during its operating life. The refrigerant leakage in such systems typically has been detected when the refrigeration system stops refrigerating due to the loss of a critical mass of the refrigerant, which is generally too late and often results in costly repairs.

Some systems utilize liquid level detectors to determine the refrigerant level in the receiver or the reservoir which holds the refrigerant of the system. Liquid level detectors are often not very reliable. There exists a need in the art of refrigeration systems to have apparatus and method for accurately and inexpensively determining when the refrigerant in the system is too low for it to efficiently operate.

The present invention provides an apparatus and a method for relatively accurately determining the low refrigerant level condition in a closed loop refrigeration system.

SUMMARY OF THE INVENTION

The present invention provides an apparatus and a method for detecting low refrigerant condition in a closed loop refrigeration system. Separate pressure sensors are installed to measure the suction pressure and the discharge pressure of the refrigeration system. When all of the compressors are turned off, usually during a defrost cycle, the difference in the discharge pressure from the compressors and the suction pressure from the evaporators is measured. A low refrigerant level alarm is activated whenever the pressure difference is below a predetermined value. A microprocessor-based control circuit is used to measure the pressure and to activate the alarm.

Examples of the more important features of the invention thus have been summarized rather broadly in order that the detailed description thereof that follows may be better understood, and in order that the contribution to the art may be better appreciated. There are, of course, additional features of the invention that will be described hereinafter and which will form the subject of the claims appended thereto.

DESCRIPTION OF THE DRAWING

For detailed understanding of the present invention, reference should be made to the following detailed description of the preferred embodiment, taken in conjunction with the accompanying drawing, in which like parts are given like reference numerals and wherein.

DESCRIPTION OF PREFERRED EMBODIMENTS

Figure 1:
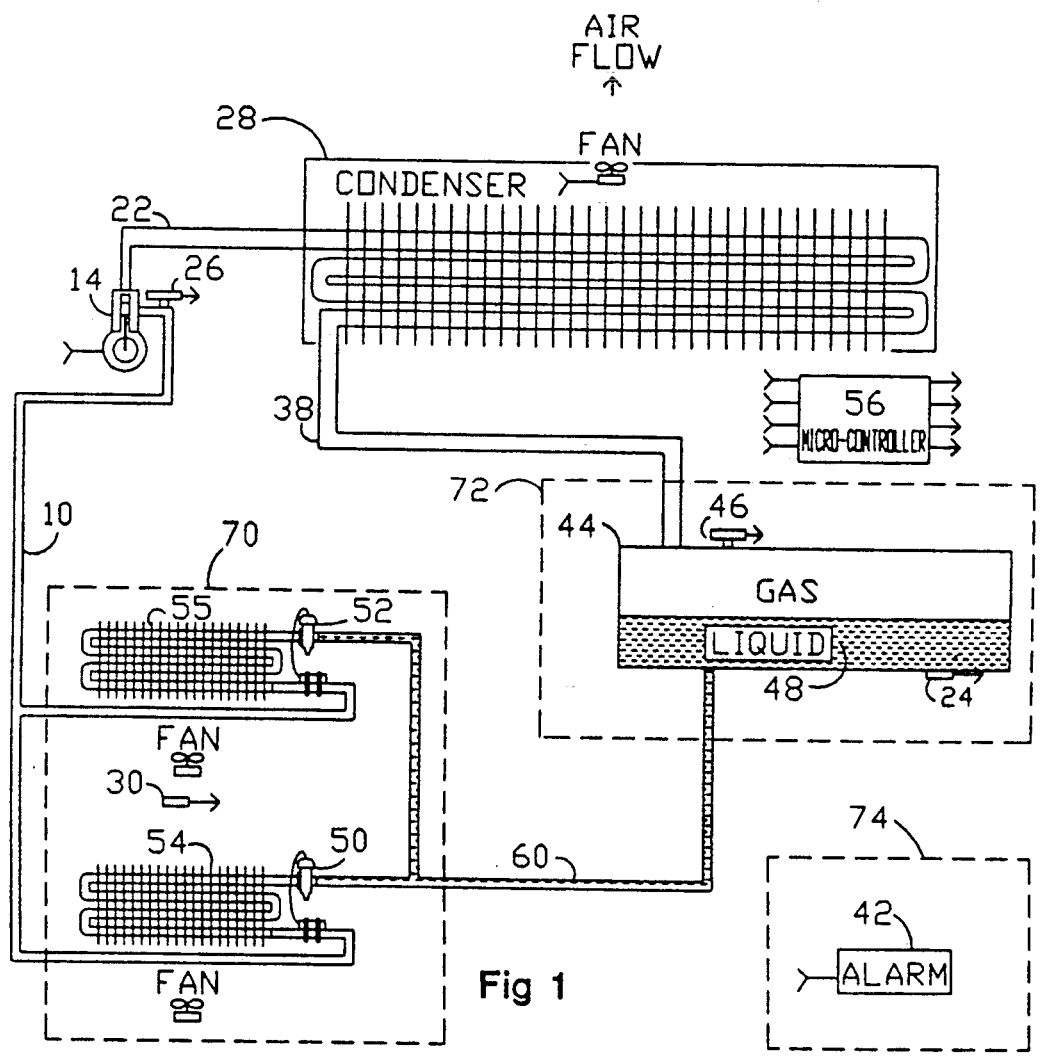
FIG. 1 depicts a closed loop refrigeration system equipped with a micro-controller control circuit for monitoring low refrigerant conditions according to the present invention.

The invention provides a refrigeration alarm system wherein a low refrigerant condition is determined by monitoring the discharge and suction pressures of a refrigeration system each time the compressor is turned off.

FIG. 1 shows a closed loop refrigeration system in which gas refrigerant at a low pressure is passed into a compressor 14 via a refrigerant tube 10. A pressure transducer 26 is installed in the refrigerant tube 10 which provides an electrical signal to a micro-controller circuit 56 that is representative of the suction pressure of the gas (low pressure). Compressor 14 compresses the refrigerant to a high pressure gaseous state and discharges it through a refrigerant tube 22 into a condenser 28. The high pressure high temperature gas is cooled to the condensation point in the condenser 28 to a liquid by circulating air across it. The liquid is drained into a receiver 44 which holds a body of liquid 48 refrigerant therein through a drain tube 38. A pressure transducer 46 is installed in the receiver 44, which provides an electrical signal to the micro-controller circuit 56 that is representative of the discharge pressure from the compressor (high pressure).

Micro-controller circuit 56 contains a microprocessor and other circuitry including memory, analog to digital converter, and switching circuitry which enables it to acquire information or signals from various sensors used in the refrigeration system and processes that information to control various elements and functions of the refrigeration system. Outwardly pointing arrows at the micro-controller circuit 56 signify that it is electrically coupled to refrigeration system elements for providing electrical signals to those elements and thereby controlling the function of those elements. Inwardly pointing arrows at the micro-controller circuit 56 signify that it is electrically coupled to system elements, such as transducers, for receiving information from them. Accordingly, transducers are shown with outwardly pointing arrows signifying that they are supplying information to the micro-controller circuit 56, and compressor 14 and alarm 42 have inwardly pointing arrows signifying that information is delivered to them from the mirco-controller circuit 56.

The liquid refrigerant 48 from the receiver 44 is transmitted via a tube 60 to expansion valves 50 and 52. The expansion valves 50 and 52 meter the liquid to their respective evaporator coils 54 and 55. In coils 54 and 55 the liquid is evaporated to a low pressure (suction pressure) gas. The evaporation process extracts heat from the air passing over the coils of the evaporators 54 and 55, thereby refrigerating the area 70. The low pressure gas from the evaporator coils 54 and 55 is transferred via the refrigerant tube 10 to the compressor 14 to repeat the refrigeration cycle.

A temperature sensor 30 provides micro-controller circuit 56 an electrical signal which is representative of the temperature of the refrigerated area 70. The micro-controller circuit 56 controls the temperature of the refrigerated area 70 by comparing it with set-points which have been programmed into the micro-controller circuit 56 and turning on the compressor 14 when the area 70 temperature is above a cut-in set-point and turning off the compressor when the area 70 temperature is below a cut-out set-point. Often, frost accumulates on the evaporator coils when the compressor is running, which reduces the system efficiency. The frost is typically removed by periodically turning off the compressor 14 for a sufficient time to enable the area 70 temperature to rise high enough to melt the frost.

During the periods in which the compressor 14 is turned off, the pressure in coils 54 and 55 will approach or reach the temperature equivalent of the surrounding area 70 while the pressure in the receiver 44 will approach or reach the temperature equivalent of the area 72. However, if the receiver 44 is low in refrigerant, all or most of the refrigerant will quickly empty into evaporator coils 54 and 55 when the compressor is turned off. This will cause the discharge pressure ($P_d$) in receiver 44 and condenser 28 to fall toward the suction pressure ($P_s$) in the evaporator coils 54 and 55. Therefore, if the discharge pressure is close to or equal to the suction pressure when the compressor 14 is turned off, a low refrigerant condition will exist. Stated in other words, when the pressure difference ("$\Delta p$") between the discharge pressure and the suction pressure is below a certain value, it would indicate a low refrigerant condition. Thus, by monitoring the pressures at the pressure transducers 26 and 46, a low refrigerant condition can be detected during the off cycle of the compressor 14.

Under certain conditions, low refrigerant condition may be detected by comparing the condenser pressure when the compressor is turned off (off-cycle) with the condenser pressure measured after a certain time period when the compressor is next turned on (immediate succeeding on-cycle). If the condenser pressure during the on-cycle is greater than the pressure during the immediately preceding off-cycle by more than a predetermined value, the micro-controller circuit 56 would activate the low refrigerant indicator 42. It has been found that for most applications a low refrigerant condition is present when the condenser pressure during the on-cycle exceeds the lowest condenser pressure during the off-cycle by a factor of 2.35 or more.

The micro-controller circuit 56, which is electrically coupled to the pressure transducers 26 and 46, computes the pressure difference between the discharge pressure $P_d$ measured at the pressure transducer 46 and the suction pressure $P_s$ measured at the pressure transducer 26 whenever the compressor 14 is turned off, compares the pressure difference $\Delta p$ with a predetermined value or set point and indicates a low refrigerant condition whenever the $\Delta p$ is below the set point. The low refrigerant condition is indicated by activating the alarm 42, which may be a visual means, an audio alarm or any other suitable means. The micro-controller circuit also may be programmed to shut down the refrigeration system when a low refrigerant condition is indicated. The alarm 42 may be located at any suitable place to alert the personnel who are attending to the refrigeration system.

In the case where the area temperature 72 varies, the temperature probe 24 is used to measure the temperature of the receiver 44 or liquid line 60, which is supplied to the micro-controller circuit 56. Micro-controller circuit 56 determines the equivalent condensing pressure. If the equivalent condensing pressure is below the pressure equivalent of the temperature of the area 72 the alarm condition is valid; otherwise, the alarm condition is aborted.

The present invention, thus, determines whether a low refrigerant condition exists each time the compressor is turned off and, when appropriate, activates a low refrigerant indicator. While the invention has been described in accordance with an air cooled condenser and a single compressor system, one experienced in the art may easily apply the invention to refrigeration systems having multiple compressors and other types of condensers, such as water or fluid cooled condensers. However, when multiple compressors are utilized, it would generally be necessary to turn off all of the compressors before measuring the discharge and suction pressures to determine whether a low refrigerant condition exists. Additionally, many modifications and changes to the refrigeration system described herein are possible without departing from the scope or the spirit of the invention. It is intended that the present invention covers all such changes and modification and that the invention is limited only by the limitations contained in the appended claims.

What is claimed is:

1. A method of detecting a low refrigerant condition in a refrigeration system having a compressor for compressing the refrigerant from a suction pressure to a discharge pressure, the method comprising the steps of:
    (a) turning off the compressor for a time period;
    (b) measuring the suction pressure while the compressor is off;
    (c) measuring the discharge pressure while the compressor is off;
    (d) computing the pressure difference between the discharge pressure and the suction pressure; and
    (e) indicating a low refrigerant condition when the pressure difference is below a predetermined value.

2. A method of detecting a low refrigerant condition in a closed loop refrigeration system having a receiver containing a body of fluid, said method comprising the steps of:
    (a) compressing gaseous refrigerant by a compressor from a low suction pressure to a high discharge pressure;
    (b) condensing the high pressure refrigerant into a liquid and discharging it into the receiver;
    (c) evaporating the liquid refrigerant from the receiver in an evaporator to a low suction pressure gas;
    (d) periodically turning off the compressor for a time period;
    (e) measuring the suction pressure in the evaporator each time the compressor is turned off;
    (f) measuring the discharge pressure in the receiver each time the compressor is turned off;
    (g) computing the pressure difference between the receiver pressure and the pressure in the evaporator; and
    (h) indicating a low refrigerant condition whenever the pressure difference is below a predetermined value.

3. A method of determining a low refrigerant condition in a refrigeration system wherein a compressor compresses a gaseous refrigerant from a low evaporator pressure to a high condense pressure, a condenser condensing the high pressure gas into a liquid and discharges it into a receiver, said method comprising the steps of:
    (a) shutting down the compressor for a time period;
    (b) measuring the refrigerant pressure in the receiver after the compressor has been shut down;
    (c) measuring the refrigerant pressure in the evaporator after the compressor has been shut down;
    (d) determining the pressure equivalent of the temperature of the area surrounding the receiver; and (e) indicating a low refrigerant condition when the refrigerant pressure in the receiver is less than the pressure equivalent of the temperature of the area surrounding the receiver and is less than a predetermined value above the pressure of the gaseous refrigerant in the evaporator.

4. A refrigeration system having in a closed loop connection a compressor for compressing low suction pressure gas refrigerant from an evaporator to a high discharge pressure, a condenser for condensing the high pressure refrigerant into a liquid and discharging it into a receiver containing a body of fluid, said evaporator receiving the liquid refrigerant from the receiver and evaporating it into the low pressure gas refrigerant, said refrigeration system further comprising:
  (a) a low refrigerant level indicator;
  (b) a first pressure transducer connected between the compressor and the evaporator for providing an electrical signal that is representative of the suction pressure;
  (c) a second pressure transducer connected between the compressor and the receiver for providing an electrical signal that is representative of the discharge pressure; and
  (d) a control circuit electrically coupled to the low refrigerant level indicator and the first and second pressure transducers, said control circuit receiving the electrical signals from the first and second pressure transducers and in response thereto activating the low refrigerant indicator whenever the pressure difference between the discharge pressure and the suction pressure is below a predetermined value.

5. The refrigeration system of claim 4 wherein the control circuit contains a microprocessor.

6. A method of determining low refrigerant condition in a refrigeration system wherein a compressor compresses a gaseous refrigerant from a low pressure to a high condensing pressure, a condenser condenses the high pressure gas into a liquid and discharges it into a receiver, said method comprising the steps of:
  (a) shutting down the compressor for a time period;
  (b) measuring the refrigerant pressure in the receiver after the compressor has been shut down;
  (c) determining the pressure equivalent of the temperature of the area surrounding the receiver; and
  (d) indicating a low refrigerant condition only when the receiver pressure is less than the pressure equivalent of the temperature of the area surrounding the receiver.

7. A method of determining a low refrigerant condition in a refrigeration system having a compressor for compressing low pressure refrigerant to a condenser pressure, said method comprising the steps of:
  (a) turning off the compressors for a period of time;
  (b) measuring the condenser pressure;
  (c) turning on the compressor;
  (d) measuring the condenser pressure a certain time period after the compressor has been turned on; and
  (e) activating a low refrigerant condition indicator if the condenser pressure measured in step (d) exceeds the condenser pressure measured in step (b) by a certain factor.

8. The method as described in claim 7 wherein said factor is equal to or greater than 2.35.

* * * * *